(12) United States Patent
Vanciu et al.

(10) Patent No.: US 12,014,751 B2
(45) Date of Patent: Jun. 18, 2024

(54) DEVICES, SYSTEMS, AND METHODS FOR AUDIO SANITIZATION

(71) Applicant: Calabrio, Inc., Minneapolis, MN (US)

(72) Inventors: Chris Vanciu, Isle, MN (US); Kyle Smaagard, Forest Lake, MN (US); Boris Chaplin, Medina, MN (US); Dylan Morgan, Minneapolis, MN (US); Paul Gordon, Minneapolis, MN (US); Matt Matsui, Minneapolis, MN (US); Laura Cattaneo, Rochester, MN (US); Catherine Bullock, Minneapolis, MN (US)

(73) Assignee: Calabrio, Inc., Minneapolis, MN (US)

(*) Notice: Subject to any disclaimer, the term of this patent is extended or adjusted under 35 U.S.C. 154(b) by 0 days.

(21) Appl. No.: 18/066,023

(22) Filed: Dec. 14, 2022

(65) Prior Publication Data

US 2023/0186950 A1 Jun. 15, 2023

Related U.S. Application Data

(60) Provisional application No. 63/289,478, filed on Dec. 14, 2021.

(51) Int. Cl.
*G11B 20/10* (2006.01)
*G11B 27/022* (2006.01)

(52) U.S. Cl.
CPC .......... *G11B 20/10* (2013.01); *G11B 27/022* (2013.01)

(58) Field of Classification Search
CPC ........ G11B 27/031–032; G11B 27/034; G11B 27/036; G11B 20/10
USPC ........................................... 375/316
See application file for complete search history.

(56) References Cited

U.S. PATENT DOCUMENTS

| | | | |
|---|---|---|---|
| 9,641,676 B1* | 5/2017 | Mandic | H05K 999/99 |
| 10,002,639 B1* | 6/2018 | Gaeta | G10L 21/00 |
| 10,305,683 B1* | 5/2019 | Ghafourifar | H04L 9/0816 |
| 10,410,000 B1* | 9/2019 | Ghafourifar | G06F 21/10 |
| 10,728,384 B1* | 7/2020 | Channakeshava | G06F 21/6245 |
| 2007/0030528 A1* | 2/2007 | Quaeler | G06F 16/33 |
| | | | 358/448 |
| 2012/0033948 A1* | 2/2012 | Rodriguez | G11B 27/034 |
| | | | 386/282 |

(Continued)

*Primary Examiner* — Qutbuddin Ghulamali (57) ABSTRACT

Disclosed herein are computer-implemented devices, systems, and methods for sanitizing an audio recording of a conversation. In an example, such a computer-implemented method can include selecting a transcript of the conversation. The transcript can include a plurality of redaction markers within the audio recording. The plurality of redaction markers can be identifiable via one or more redaction marker start and/or end points. The computer-implemented method can include identifying a first redaction marker and a second redaction marker of the one or more redaction markers. The first redaction marker can be different from the second redaction marker. In this regard, a redaction segment is formable between the first and second redaction markers. The computer-implemented method can include selecting the audio recording. The computer-implemented method can include redacting the audio recording between the first redaction marker and the second redaction marker.

18 Claims, 3 Drawing Sheets

(56) References Cited

U.S. PATENT DOCUMENTS

| | | | |
|---|---|---|---|
| 2012/0245936 A1* | 9/2012 | Treglia | G06F 16/685 704/235 |
| 2013/0266127 A1* | 10/2013 | Schachter | G10L 25/48 379/88.01 |
| 2020/0111545 A1 | 4/2020 | Syeda-Mahmood | |

* cited by examiner

DEVICES, SYSTEMS, AND METHODS FOR AUDIO SANITIZATION

FIELD OF THE DISCLOSURE

The present invention relates to the field of computer technologies, and particularly, to devices, systems, and methods for intelligent audio sanitization.

BACKGROUND

Contact centers are staffed with agents to handle customer interactions. Vast amounts of interactions between customers and agents at a contract center occur daily, increasing exponentially when considering larger periods of time. These interactions are often recorded in recordings such as audio files and corresponding transcripts. These recordings often contain sensitive information. In certain cases, preventing non-authorized users from obtaining sensitive information from both audio and the corresponding transcript of the audio is a consideration for the contact centers.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. General aspects include a computer-implemented method for sanitizing an audio recording of a conversation. In an example, the computer-implemented method includes selecting the audio recording of the conversation, the audio recording being capable of being transcribed to a transcript; identifying one or more redaction markers at which to mask the audio recording, the one or more redaction markers being identifiable using at least one of the audio recording and the transcript, the one or more redaction markers having a start point and an end point between which a redaction segment is formable; and sanitizing the audio recording by forming redaction segments at the one or more redaction markers. Other examples of this aspect include corresponding computer systems, apparatus, and computer programs recorded on one or more computer storage devices, each configured to perform the actions of the methods.

Implementations may include one or more of the following features. The computer-implemented method where identifying the one or more redaction markers includes identifying a plurality of redaction markers to be merged within the redaction segment. The audio recording is a mono-channel recording or a multichannel audio recording, and where when the audio recording is a multichannel audio recording, identifying the plurality of redaction markers includes comparing redaction markers across different channels in the multichannel audio recording. First and second redaction markers of the plurality of redaction markers are in redtime proximity such that redacting the audio recording between the start point of the second redaction marker and the end point of the first redaction marker minimizes uneven audio. Sanitizing the audio recording includes removing voice data and background noise that has been recorded in the audio recording. The one or more redaction markers are identifiable using the transcript. The one or more redaction markers are identifiable using the transcript; and where the one or more redaction markers optionally correspond to dead spaces within the conversation as indicated by the transcript. Sanitizing the audio recording may include outputting audio from the audio recording to an audio file such that the audio file includes both masked audio at the redaction segments and non-redacted audio outside of the redaction segments, the audio file thereby becoming a sanitized audio file. Identifying the one or more redaction markers is performed by a machine learning architecture. Implementations of the described techniques may include hardware, a method or process, or computer software on a computer-accessible medium.

General aspects include a data processing system for intelligently sanitizing an audio recording of a conversation. The data processing system also includes an input module that is configured to receive the audio recording of the conversation, the audio recording being capable of being transcribed to a transcript; an identification module that is configured to identify one or more redaction markers at which to mask the audio recording, the one or more redaction markers being identifiable using at least one of the audio recording and the transcript, the one or more redaction markers having a start point and an end point between which a redaction segment is formable; and a processing module that is configured to sanitize the audio recording by forming redaction segments at the one or more redaction markers. Other examples of this aspect include corresponding computer systems, apparatus, and computer programs recorded on one or more computer storage devices, each configured to perform the actions of the methods.

Implementations may include one or more of the following features. The data processing system where identifying the one or more redaction markers includes identifying a plurality of redaction markers to be merged within the redaction segment. The audio recording is a mono-channel recording or a multichannel audio recording, and where when the audio recording is a multichannel audio recording, identifying the plurality of redaction markers includes comparing redaction markers across different channels in the multichannel audio recording. First and second redaction markers of the plurality of redaction markers are in redtime proximity such that redacting the audio recording between the start point of the second redaction marker and the end point of the first redaction marker minimizes uneven audio. Forming the redaction segment at the one or more redaction markers may include: processing the audio recording into redaction time segments and non-redaction time segments; and outputting audio from the audio recording to an audio file such that the audio file includes both masked audio at the redaction segments and non-redacted audio outside of the redaction segments, the audio file thereby becoming a sanitized audio file. Identifying the one or more redaction markers is performed by a machine learning architecture; and where forming the redaction segment at the one or more redaction markers includes removing voice data and background noise that has been recorded in the audio recording. The one or more redaction markers are identifiable using the transcript; and where the one or more redaction markers correspond to dead spaces within the conversation as indicated by the transcript. Implementations of the described techniques may include hardware, a method or process, or computer software on a computer-accessible medium.

General aspects include a non-transitory computer-readable medium that stores instructions that. The non-transitory computer-readable medium also includes select an audio recording of a conversation, the audio recording being capable of being transcribed to a transcript; identify one or more redaction markers at which to mask the audio recording, the one or more redaction markers being identifiable using at least one of the audio recording and the transcript, the one or more redaction markers having a start point and an end point between which a redaction segment is formable; and sanitize the audio recording by forming redaction segments at the one or more redaction markers. Other examples of this aspect include corresponding computer systems, apparatus, and computer programs recorded on one or more computer storage devices, each configured to perform the actions of the methods.

Implementations may include one or more of the following features. The non-transitory computer-readable medium where the one or more redaction markers is identifiable using the transcript; where the one or more redaction markers correspond to dead spaces within the conversation as indicated by the transcript; and where sanitizing the audio recording may include outputting audio from the audio recording to an audio file such that the audio file includes both masked audio at the redaction segments and non-redacted audio outside of the redaction segments, the audio file thereby becoming a sanitized audio file. Identifying the one or more redaction markers includes identifying a plurality of redaction markers to be merged within the redaction segment, the plurality of redaction markers including first and second redaction markers; and where at least one of: the audio recording is a mono-channel recording or a multichannel audio recording, and where when the audio recording is a multichannel audio recording, identifying the plurality of redaction markers includes comparing redaction markers across different channels in the multichannel audio recording; and the redaction markers are within redtime proximity to the first redaction marker or the second redaction marker such that redacting the audio recording between the start point and the end point minimizes uneven audio. Forming the redaction segment at the one or more redaction markers may include: processing the audio recording into redaction time segments and non-redaction time segments; and outputting sanitized audio to an audio file such that the audio file includes masked audio at the redaction segment. Implementations of the described techniques may include hardware, a method or process, or computer software on a computer-accessible medium.

Additional features and advantages of the present disclosure will become apparent to those skilled in the art upon consideration of the following detailed description of the illustrative examples exemplifying the disclosure as presently perceived.

BRIEF DESCRIPTION OF THE DRAWINGS

The above-mentioned and other features and advantages of this disclosure, and the manner of obtaining them, will become more apparent, and will be better understood by reference to the following description of the exemplary examples taken in conjunction with the accompanying drawings, wherein.

Corresponding reference characters indicate corresponding parts throughout the several views. Although the drawings represent examples of various features and components according to the present disclosure, the drawings are not necessarily to scale and certain features can be exaggerated in order to better illustrate and explain the present disclosure. The exemplification set out herein illustrates an example of the invention, and such an exemplification is not to be construed as limiting the scope of the invention in any manner.

DETAILED DESCRIPTION OF THE DRAWINGS

For the purposes of promoting an understanding of the principles of the present disclosure, reference is now made to the examples illustrated in the drawings, which are described below. The exemplary examples disclosed herein are not intended to be exhaustive or to limit the disclosure to the precise form disclosed in the following detailed description. Rather, these exemplary examples were chosen and described so that others skilled in the art can utilize their teachings. It is not beyond the scope of this disclosure to have a number (e.g., all) of the features in a given example be used across all examples.

As backdrop, in a typical scenario, call centers create audio recordings of a phone call. These phone calls can include both sensitive information and non-sensitive information. For discussion purposes, sensitive information as used herein can be any information that an entity has deemed undesirable or inappropriate within a conversational recording. Ideally, this information would be removed during audio creation, such as by pausing the recording live when obtaining sensitive information from a customer, such as credit card or social security numbers. Despite even the best efforts, however, there is great difficulty with knowing ahead of time what information should be removed, which leads to the audio recording including some sensitive information. The audio recording is then transcribed into a textual representation (e.g., a transcript of the call) using a transcription engine. As this transcription follows the audio recording, the transcript of the audio would also contain the sensitive information. Under these circumstances, the audio recording will have to be manually inspected. Manual inspection by listening and "clipping" the audio recording manually is a labor-intensive process, and then the audio recording would need to be re-transcribed to provide a transcript also free from sensitive information.

Principles of the present disclosure are useful in removing sensitive information from an audio recording with the goal of preventing subsequent release of sensitive information contained therein. To start, an audio recording is required. This audio recording is often a non-sanitized audio recording or an audio recording that has been partially sanitized and needs additional sanitization. Detection of sensitive information contained within the audio recording can be performed in numerous ways. For instance, sensitive information can be directly detected in the speech of the audio recording and can be subsequently removed such that only the audio recording is required for sanitization. In other examples, both the audio recording and the sanitized transcription of that audio recording may be required prior to removal of the sensitive information. Under these circumstances, a tandem approach can be used such that a sanitized transcription of the audio recording provides redaction information to the sanitizer to perform audio redaction. Certain examples disclosed herein combine transcription sanitization and audio sanitization within the same program. These examples allow for removal of any manual or other external sanitization step and only require the original audio file and original transcription of that audio file to produce sanitized versions thereof. Regardless of how the sensitive information is detected, the present disclosure provides principles for sanitizing audio recordings and/or transcriptions thereof to be free of sensitive information. Further examples employing these principles are discussed below.

Figure 1:
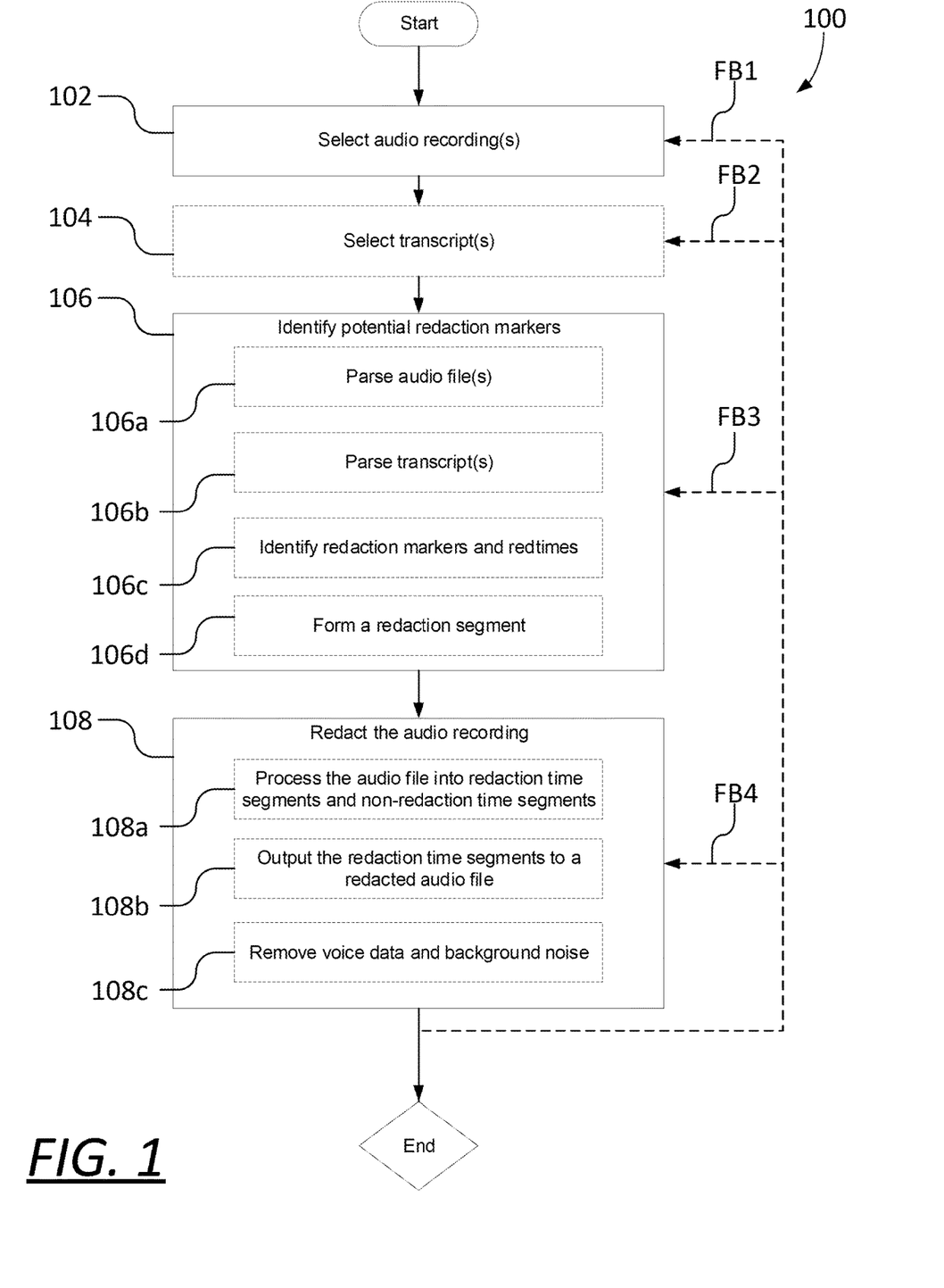
FIG. 1 is a flowchart of a method for sanitizing an audio recording of a conversation, according to principles of the present disclosure.

FIG. 1 is a flowchart of a method 100 for sanitizing an audio recording of a conversation. These conversations can be phone calls taken at a call center. The method 100 can begin with a non-sanitized, input audio file and result in a sanitized audio file. As indicated by the dashed lines, several steps or routes of the method 100 may be omitted or modified depending on the particular implementation of the method 100. For instance, certain steps and feedback loops (e.g., FB1, FB2, FB3, and FB4) are shown in dashed lines. While only certain methods are discussed herein for conciseness, this disclosure should not be limited to teaching only those discussed methods. Rather it is the intention that one skilled in the art will appreciate the various iterations and modifications of the method 100 without them being discussed herein ad nauseam. Further details of the illustrated method 100 and related principles of the present disclosure are provided below.

According to principles of the present disclosure, the method 100 illustrated in FIG. 1 relates to computer-implemented methods for sanitizing an audio recording of a conversation. Such a computer-implemented method 100 can include selecting the audio recording at step 102. The method 100 can include, at step 104, selecting a transcript of the conversation where the transcript can be parsed or otherwise deciphered for sensitive information. The transcript can include a plurality of redaction markers (e.g., dead spaces, segments following prompts for sensitive information, redaction marker, etc.) within the audio recording. "Dead spaces" as used herein refers to missing segments of time in the transcript. These may result from removing sensitive information simply by extracting it (e.g., using a transcript sanitizer). Prompts for sensitive information can be detected by a transcript sanitizer, and in a combined audio/transcript process, the transcript sanitizer portion detects prompts for sensitive information and deem some following portion thereof as needing redaction. Redaction markers placed by a prior sanitization process could also be present. Considering a non-limiting example, each redaction marker in the plurality of redaction markers includes a start point and an end point, each of which is identifiable (e.g., via software as further discussed below). As further discussed below, a redaction segment includes one or more redaction markers in the plurality of redaction markers (e.g., due to "redtime" or overlapping conversation). As such, one or more actual redaction segments can be derived from the plurality of redaction markers and used to make redactions.

A redaction marker can be used in redacting the audio recording. Redaction markers as used herein can refer to snippets of the audio recording having a start time and an end time that are to be used for redaction, resulting in a redaction segment with masked audio. According to principles of the present disclosure, redaction markers may themselves become a redaction segment or may be combined (as further discussed below) with other redaction markers to form a redaction segment that is longer than the individual redaction markers in the combination. The computer-implemented method 100 can include, at step 106, identifying a first redaction marker and a second redaction marker of the one or more redaction markers.

As shown here in FIG. 1, redaction markers can be identified in numerous ways and may even be a multifaceted process. For instance, identifying potential redaction markers can include, at step 106a, parsing the audio file and, in addition or in alternative, parsing the corresponding transcript of the audio file at step 106b. For instance, such parsing can include deciphering sentiments from the audio file and/or the transcript via machine learning processes such as natural language processing. Relative positioning of the identified redaction markers can be determined such that, as outlined below, redaction markers that are within redtime proximity of each other (e.g., those that may produce uneven audio) can be identified prior to or after formation of redaction segments.

Redaction of the audio recording can include forming numerous redaction segments to be used when processing the audio recording to remove sensitive information. For instance, the first redaction marker can be different from the second redaction marker such that the second redaction marker has a later timestamp in the audio recording than that of the first redaction marker. In this regard, a redaction segment is formable using start and end times of the first and second redaction markers. Redaction segment as used herein can be one or more redactions made between redaction markers and, where there are overlapping redactions, a redaction formed starting with a start of a first redaction and ending with end of last overlapped redaction. For instance, at step 106c, redaction markers and redtimes can be identified, and then at step 106d redaction segments can be formed (e.g., using the redaction markers and the redtimes as discussed elsewhere herein). In such examples, a redaction segment is formable between the two redaction markers if the start of the second redaction marker is within the redtime of the end of the first redaction marker.

At step 108, the computer-implemented method 100 can include redacting the audio recording using the redaction segments. As shown, this step 108 can be performed in a variety of manners. Redactions can be made on the fly as the audio file is being processed or streamed, e.g., such that the sanitized audio file contains both redacted and unredacted portions. This manner may be preferable for applications where conserving memory resources is preferable. In certain instances, redactions can be made all at once (e.g., bulk processed) where redacted portions and unredacted portions are separately stored in memory such that the sanitized audio file can be produced by stitching together the unredacted portions, leaving out the redacted portions. In this regard, when creating the sanitized audio, as further described below, the method 100 can include, at step 108a, processing the audio file into redaction time segments and non-redaction time segments. At step 108b, the method 100 includes outputting non-redaction time segments and optionally outputting masked segments to a file resulting in a sanitized audio file, free of sensitive information. The result of redacting the audio recording at step 108 can be an audio file that is redacted to be free of sensitive information. In any of these instances, step 108 can include, at step 108c, removing voice data and background noise as further described below.

Feedback loops can be incorporated into the method 100. For instance, these feedback loops can indicate iterative processing of a transcript and/or audio file or processing of multiple transcripts and/or audio files. For instance, FB1 can loop back to selecting another transcript after an initial full or partial transcript is processed, and FB2 can loop back to selecting another audio recording after an initial full or partial audio file is processed. In addition, or in alternative, FB3 can indicate an iterative redaction process where redaction markers are identified at step 106 and then redacted at step 108 until no more redaction markers are identified. In addition, or in alternative, FB4 can indicate an iterative redaction process where all potential redaction markers are identified at step 106 and then looped through in redacting the audio recording at step 108 until no more redaction markers are identified.

Flexibility in processing can be a characteristic of the principles disclosed herein. For example, the source audio file and the outputted audio file can have mono sound or stereo sound. When the source audio file is in stereo, special considerations may be required to ensure that the outputted audio is high quality after it is redacted. For instance, when the source recording is mono sound (e.g., a mono-channel audio recording), redactions can be made on a single channel. On the other hand, when the source audio file is in stereo, synchronized across multiple channels, each of the channels containing audio can require separate and/or cross-channel treatment to produce a high-quality sanitized audio.

Figure 2:
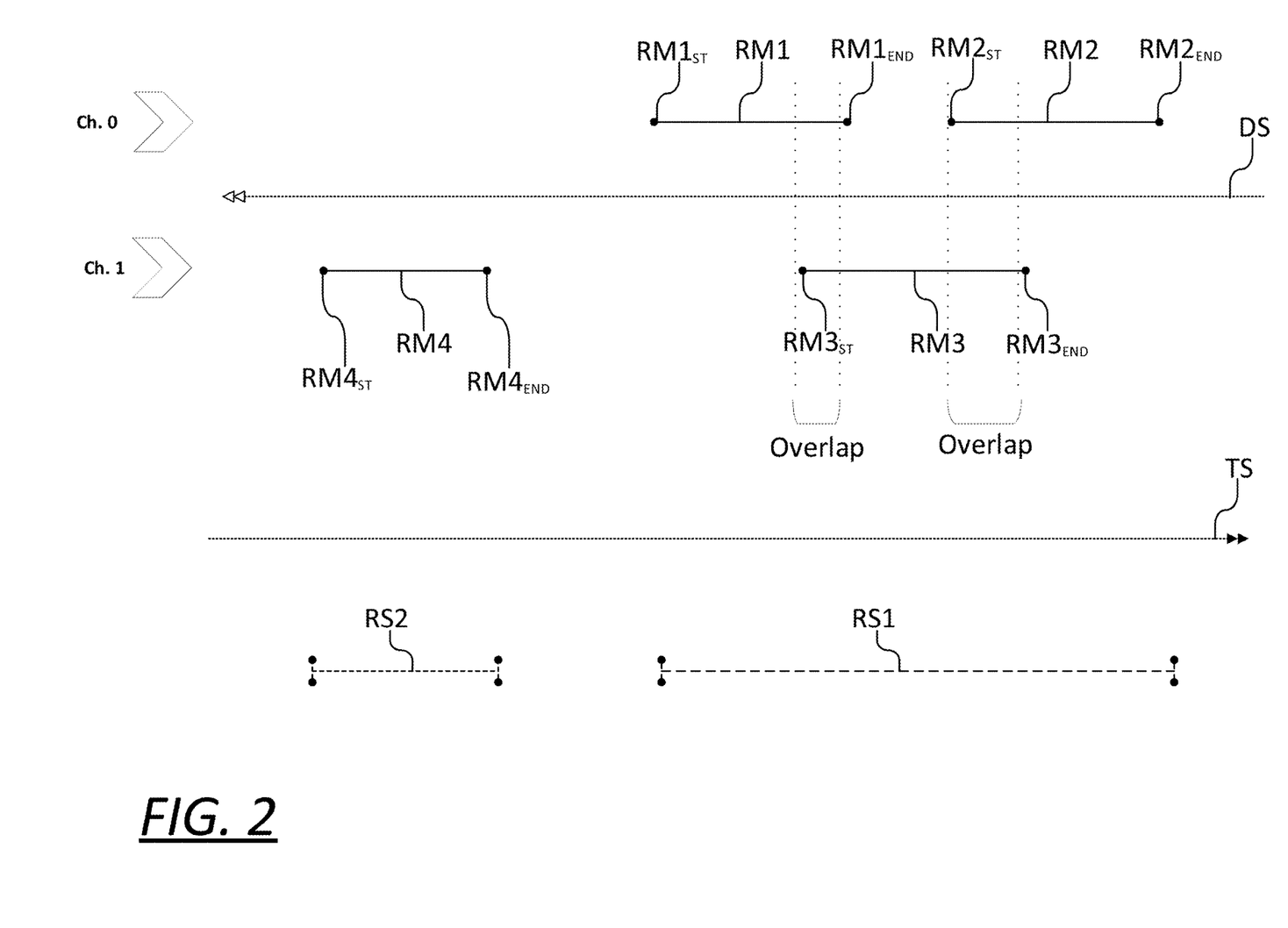
FIG. 2 is a schematic diagram of a multichannel audio recording for processing, according to principles of the present disclosure.

FIG. 2 shows a schematic diagram of a stereo recording of an audio file that can be employed in implementations of the present disclosure, including in the methods discussed above. As shown here, there is a first channel ("Ch. 0"), a second channel ("Ch. 1"), a data stream ("DS"), and a time stream ("TS"). The data stream and time stream can be associated with the audio recording. During processing, for example, the data stream can move in an opposite direction (left as shown here) to the time stream (right as shown here). Also shown here, are a plurality of redaction markers (e.g., "RM1," "RM2," "RM3," and "RM4") where RM1 and RM2 are associated with Ch. 0 and RM3 and RM4 are associated with Ch. 1. RM1 includes RM1 start and end points ($RM1_{ST}$, $RM1_{END}$), RM2 includes RM2 start and end points ($RM2_{ST}$, $RM2_{END}$), and RM3 includes RM3 start and end points ($RM3_{ST}$, $RM3_{END}$). For illustration purposes, redaction segments ("RS1" and "RS2") that can be formed from the redaction markers are shown below TS.

Several considerations can influence which redaction markers are used to form a redaction segment. In examples, identifying the one or more redaction markers can include identifying a plurality of redaction markers to be merged within the redaction segment. For instance, depending on parameters selected by an operator, $RM1_{ST}$ and $RM2_{END}$ are the start and end of RS1 such that $RM1_{END}$ and $RM2_{ST}$ are not used but are "merged" within RS1. One such parameter is redtime (e.g., the time proximity between the end of one redaction marker and the start of another). Of course, intervening words will break up redaction markers as there is no dead space during this time. In this regard, standalone redaction markers (e.g., those not in redtime proximity of other redaction markers) such as RM4 can themselves be used to form a redaction segment such as RS2. Redtime can be set to a sensible value (e.g., long enough to include breaths or pauses in conversation but short enough such that the entire audio recording is not redacted) and can be adjustable to user preference. Examples of how redtime can be incorporated into principles of the present disclosure are discussed in more detail below.

$RM1_{END}$ and $RM2_{ST}$ can be said to be within redtime proximity of each other. In this regard, identifying a plurality of redaction markers to be merged within the redaction segment includes comparing and merging redaction markers within a channel. As noted above, the audio recording can be a multichannel audio recording, which may lend to different mergers and comparisons than those available within a single channel. For instance, there may be redtime proximity between $RM1_{END}$ and $RM3_{ST}$ as well as between $RM2_{ST\ and}$ $RM3_{END}$. In addition, or in alternative, identifying intervening redaction markers to be merged within the redaction segment can further include comparing and merging redacted segments across different channels. For instance, RM1, RM2, and RM3 may have sufficient overlap such that a redaction segment is formed between $RM1_{ST}$ and $RM2_{END}$, which will effectively merge RM1, RM2, and RM3 together. It should be noted that, for instance, when $RM3_{END}$ extends beyond $RM2_{END}$ the redaction segment will extend to $RM3_{END}$.

In any of these instances, redacting the audio recording using the first and second redaction markers can minimize uneven audio. The principles discussed above can be repeated and extrapolated to cover an entire audio recording. For instance, in a non-limiting example, redaction markers can be compared and merged within a channel to avoid uneven audio. Within a given channel, if two redaction markers are close enough together (e.g., within redtime proximity of each other) without an interceding non-redacted word or words, then the two redactions are combined to form a single longer redaction. The end of the single longer redaction can then be compared to the start time of the next redaction marker or redaction segment to determine if the redaction segment should again be extended. Multi-channel recordings very often contain crosstalk such that if audio from one channel is redacted, those elements can still be heard on other channels. To compensate for this phenomenon, both channels should be masked for each redaction. In this regard, during the process of combining single redactions into longer redactions for smooth audio on a single channel, redaction overlaps may also be identified. A redaction overlap occurs when a redaction on one channel starts, but redaction end plus redtime does not end until after the start of a redaction on another channel. Overlaps can be combined to form a longer redaction segment.

Certain audio in the redaction segments can be preserved. In example implementations disclosed herein blank out all data from the audio recording in a redaction segment. This means that not only is voice data removed but also removed is background noise that has been recorded together with the voice data. In addition, or in alternative, some implementations remove only the voice data, leaving the background noise. Doing so may provide a more pleasant experience for the listener. This may be particularly useful when background noise would be required or desired such as "cleaning up" audio for the purpose of isolating background noise to be more prominent.

Perhaps best understood within the context of a more specific nonlimiting example, discussion now turns to such an example implementation of the principles of the present disclosure. Here, software employing principles of the present disclosure requires an audio recording that is intended for sanitization. In addition, the software in this example requires a sanitized transcription file containing redaction markers indicating potential redaction locations in terms of start and end times of each redaction marker. It should be noted here that not all examples disclosed herein require both an audio recording and a transcription file. In fact, some such examples only require the audio recording to begin sanitization. The example discussed below, however, used both an audio recording and a transcription file. Using both a non-sanitized audio recording and a sanitized transcription file, the software can create a sanitized audio file as described below in more detail.

In general, the process can begin with a non-sanitized audio recording in an audio file that is intended for sanitization. Non-sanitized transcript(s) that correspond to the audio record can be accessed by the software and can be sanitized into sanitized transcript(s) in the form of a sanitized transcript file (e.g., in JSON format, another digital format, a vendor-specified format, and the like). Optionally, the software can generate the sanitized transcript files by executing the software against the non-sanitized transcript(s). In either of these instances, sanitizing the transcript can create redaction markers that will eventually be formed into redaction segments (e.g., whether taken alone or combined with other redaction markers as discussed elsewhere herein). Redacting the audio recording can now commence using the non-sanitized audio file(s) (e.g., in way or other audio file format) and sanitized transcript file that now have redaction segments for redacting the corresponding non-sanitized audio. The software can sequentially process the sanitized transcript file to locate a segment (e.g., a redaction or non-redaction segment) and write appropriately the corresponding audio (redaction mask or normal audio). Alternatively, the software can process the entire sanitized transcript file to generate a list of redaction and non-redaction segments and then run through the list to process the audio file into a sanitized audio file.

Producing a sanitized audio file in this manner offers numerous advantages. Marked redactions are applied to the corresponding audio recording in a programmatic process (rather than the manual human process required for pausing of audio during gathering of sensitive data). When additional data types are determined to be sensitive after an audio recording has been created, it is too late for conventional call pausing for sanitization as the audio is already recorded. In this regard, principles of the present disclosure facilitate sanitization of the transcript for additional data types without need for re-transcription, which can be costly. Thus, these principles can eliminate the labor-intensive process of manually clipping audio recordings. Any need to develop code to handle the new data types in the audio recording may also be mitigated as it is often faster to review transcripts for intended redactions than it is to listen to audio to verify the appropriate information was redacted.

Machine learning can be used to analyze audio after initial audio generation. If alternate types of data are determined to be sensitive information, the machine learning can be applied to locate and remove the newly identified sensitive data. The audio would then need to be re-transcribed to produce a transcript free of sensitive data.

When bulk processing redactions, resulting redactions are compiled into a redaction list. This process creates a list of redaction segments that will be used to create the resulting redacted audio file with N channels with M sample width. In examples, the dead spaces within the audio recording can be indicative of redactions within the conversation. In lieu of using redaction markers, the software can determine dead space or times within the transcript that contain no spoken words (as they have been removed by sanitization). Dead space can be detected by comparing the end time of one word with the start time of the next word. If the gap between them is greater than a predetermined/configurable amount, one may assume a word has been redacted.

At this point the frames in the audio file could be calculated from the redaction markers on the redaction list. The times in the audio recording that correspond to the redaction markers will be masked as the redacted audio file is written. However, doing so when multiple words in a row have been redacted would lead to a series of short silent spots intermingled with background noise making for uneven audio. Here is where merging and comparing redaction markers and/or redaction segments within and/or across channels to even out the audio before the redaction list is created.

The comparing and merging process noted above forms a final redaction list. This list can be used to direct processing of the audio file. The audio file is read in segments corresponding to redaction and non-redaction times. A redaction start time is used to calculate the ending frame number of non-redacted audio segment. As preview to the more detailed discussion below, this segment is read from the original audio and written directly to a sanitized audio file. Next the redaction end time is used to calculate the length of the redaction in number of frames. This number of frames is written as silence (or tone, or another appropriate mask to be applied) to the sanitized audio file and is consumed from the input file. The next redaction start time marks the end of non-redacted audio and is used to calculate the length of the non-redacted audio. This data is then read from the source audio file and written to the sanitized audio and continues until the end of the source audio file is reached.

According to principles of the present disclosure, software can be used to create the sanitized audio. The software can select the non-sanitized audio file (or directory path for a set of files), the sanitized transcription file (or directory path of corresponding sanitized transcriptions), and the output directory for placement of the sanitized audio files. Additional parameters can be set, such as setting prefix specification of output files, number of processes to use, filler value for wiping audio, logging file to log events, redtime, and multichannel overwrite may also be optionally adjusted. As noted above, redacting the audio recording between the first redaction marker and the second redaction marker can be a multi-step process. For instance, this step 108 can include processing the audio file into redaction time segments and non-redaction time segments at step 108*a*. In addition, in non-limiting examples, this step includes outputting redaction and non-redaction segments to generate sanitized audio file.

Figure 3:
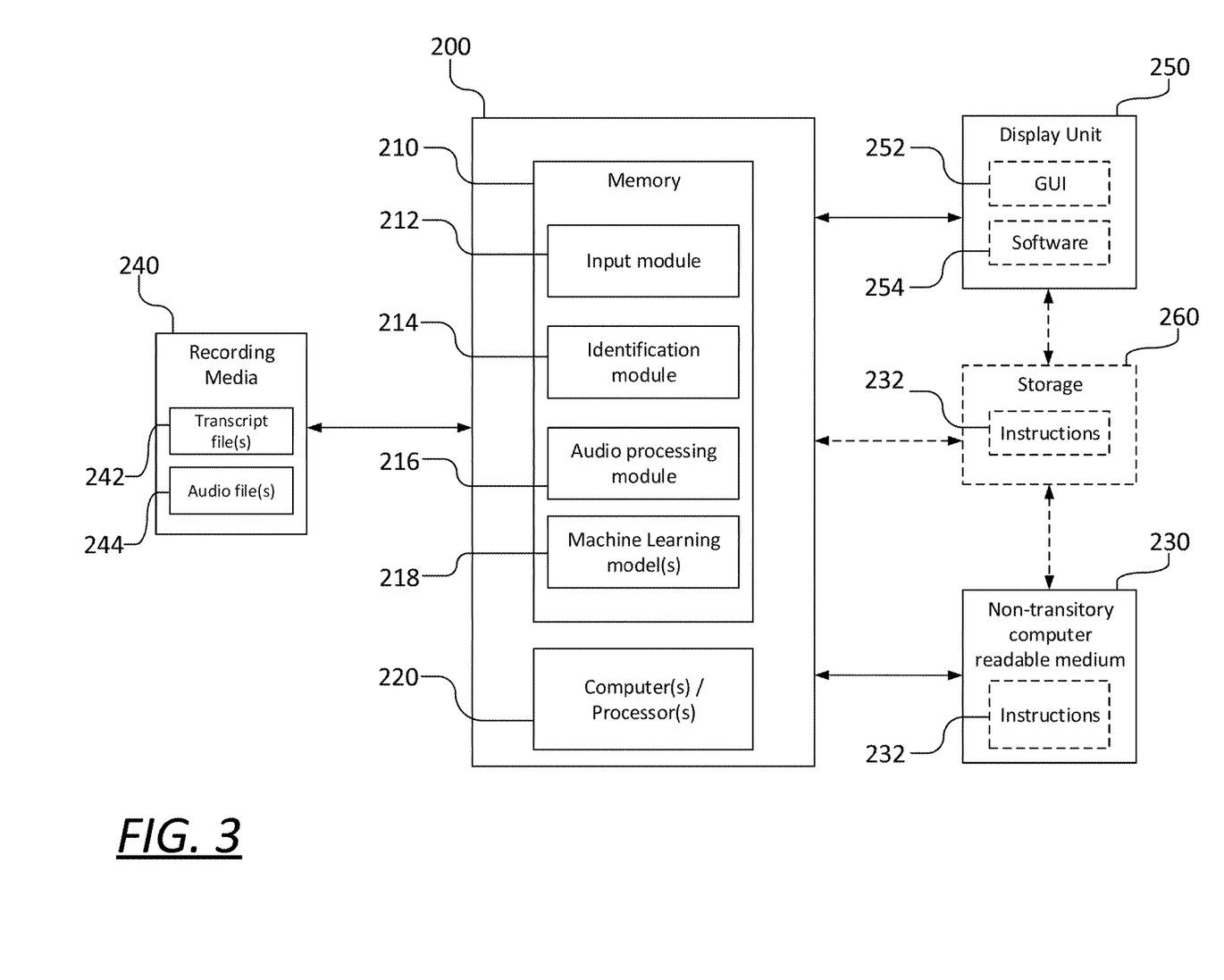
FIG. 3 is a block diagram schematic representation of a data processing system, according to principles of the present disclosure.

To start writing the sanitized audio, way data can be copied from the source way file to a destination way file, up to the point of the start of a redaction segment. Next, the portion of the audio file that is a redaction segment is moved into a memory buffer. An audio masker is then executed against the memory buffer, and the memory buffer is then written to the destination audio file. The next non-redaction segment (e.g., from end of last redaction segment to start of next redaction segment) is copied to the destination audio file. The process continues until all redaction and non-redaction segments have been written, resulting in a sanitized audio file. After the software completes writing the sanitized audio, the sanitized audio files may be retrieved from an output directory A data processing system 200 for intelligently sanitizing an audio recording of a conversation, as shown in FIG. 3, can employ principles of the present disclosure. For example, such a data processing system 200 can include a memory 210 for storing one or more modules (e.g., an input module 212, an identification module 214, and a processing module 216) and a machine learning model 218. The machine learning module can be employed to improve performance of any of the modules or functions discussed herein. In addition, or in alternative, the data processing system 200 can include a processor 220 or a computer 220 configured to access the memory 210. In this regard, exemplary procedures in accordance with the present disclosure described herein can be performed by a processing arrangement (e.g., one or more processors 220), a computing arrangement (e.g., one or more computers 220), or both. Such arrangements can be, e.g., entirely or a part of, or include, but not limited to, a computer 220, a processor 220, or both, each of which can include, e.g., one or more processors 220 (e.g., CPUs or microprocessors), and use a non-transitory computer-readable medium 230 (e.g., RAM, ROM, hard drive, or other storage device) with instructions 232 stored thereon. Instructions 232, among other things, can be stored on a storage 260 (e.g., HDD, SSD, etc.) that is in communication with the data processing system 200. In examples, the data processing system 200 can be a server running a private cloud platform or a multi-tenant platform.

The processor 220 can be in communication with a display unit 250. According to some examples of the present disclosure, the display unit 250 can be a monitor or touchscreen configured to input information to the processor 220 in addition to outputting information from the processor 220. In examples, the display unit 250 is configured to present aspects of the software 254 for input, such as selecting audio files 244 or transcript files 242, displaying the redaction list, etc. As such, the display unit 250 can include a graphic user interface 252 (GUI 252) and a software 254 as discussed elsewhere herein. User interaction with the software 254 or the model 218 can be facilitated via the display unit 250. For example, the display unit 250 can include software 254 in communication with the server and the GUI 252 with which to prompt a user and receive a user input (e.g., an analog or digital input). In examples, the display unit 250 is configured to optionally allow for user input to confirm or modify the inputs and results from the processor 220, modify criteria (e.g., redtime, masking, etc.) used by the processor 220, or trigger subsequent runs of the model 218. Of course, in other examples, the display unit 250 can be configured to allow any combination of these functions and more as these functions are just some of many examples one skilled in the art would appreciate.

Various procedures, at least some of which are similar to those in the previously discussed methods, are performed by the processor 220 in some examples. For instance, the processor 220 can be configured to process the input module 212, the identification module 214, and the processing module 216. The input module 212 can be configured to receive a plurality of redaction markers within the audio recording. As noted previously, the input for the input module 212 can be recording media 240 such as a transcript 242 (sanitized or non-sanitized) and/or an audio recording 244 (sanitized or non-sanitized).

The plurality of redaction markers (e.g., some subset of the plurality of redaction markers or each individual redaction marker) can be identifiable via redaction marker start points and/or end points. As further explanation, the identification module 214 can be configured to identify a first redaction marker and a second redaction marker of the one or more redaction markers. The first redaction marker can be different from the second redaction marker such that a redaction segment is formable between the start point of the first redaction marker and the end point of the second redaction marker. The audio recording processing module can be configured to redact the audio recording between the start point of the first redaction marker and the end point of the second redaction marker. In examples, the identification module 214 can be further configured to identify the plurality of redaction markers within the audio recording. In this regard, the dead spaces within the audio recording can be indicative of redactions within the conversation.

Several functions of the data processing system 200 can be similar to steps of the methods disclosed elsewhere herein. For instance, identifying the one or more redaction markers can include identifying a one or more (e.g., a plurality) of redaction markers to be included in the redaction segment. As noted elsewhere herein, redaction markers in the plurality of redaction markers can themselves form a redaction segment if they are standalone redaction markers (e.g., not within redtime proximity of other redaction markers). In addition, or in alternative, the audio recording can be a multichannel audio recording. Under these circumstances, identifying the one or more redaction markers includes identifying a plurality of redaction markers to be included in the redaction segment. In some such instances, this function can include comparing and merging redacted segments across different channels. In examples, the intervening redaction markers can be within redtime proximity to the first redaction marker or the second redaction marker. In this regard, redacting the audio recording between the first and second redaction markers can minimize uneven audio. In examples, identifying a first redaction marker and a second redaction marker of the one or more redaction markers can be performed by a machine learning architecture. In this regard, redacting the audio recording between the first redaction marker and the second redaction marker can include removing voice data and background noise that has been recorded in the audio recording.

In examples, redacting the audio recording between the first redaction marker and the second redaction marker as performed by the processing module 216 can be a multi-step process. For instance, this step can include processing the audio file into redaction time segments and non-redaction time segments, the redaction time segments including the redaction segment. In addition, this step can include outputting the redaction and non-redaction time segments to a destination audio file sequentially, as a batch, or some combination of the two.

With continued reference to FIG. 3, a non-transitory computer-readable medium 230 is also included in the present disclosure. The non-transitory computer-readable medium 230 can store instructions 232 that, when executed by one or more processors 220, can cause the one or more processors 220 to perform one or more functions. These functions can be similar to steps discussed in the aforementioned methods. For instance, the instructions 232 can cause the one or more processors 220 to receive a plurality of redaction markers within the audio recording. The plurality of redaction markers can be identifiable via redaction marker start points and end points. The instructions 232 can cause the one or more processors 220 to identify a first redaction marker and a second redaction marker of the one or more redaction markers. The first redaction marker can be different from the second redaction marker. In this regard, a redaction segment is formable between the first and second redaction markers. The instructions 232 can cause the one or more processors 220 to select the audio recording. The instructions 232 can cause the one or more processors 220 to redact the audio recording between the first redaction marker and the second redaction marker.

Redaction markers referenced by the instructions 232 can be used similar to manners described elsewhere herein. For instance, the instructions 232 can cause the one or more processors 220 to identify the plurality of redaction markers within the audio recording. The dead spaces within the audio recording can be indicative of redactions within the conversation. In addition, or in alternative, identifying the one or more redaction markers includes identifying a plurality of redaction markers to be merged within the redaction segment. Under these circumstances, the audio recording can be a multichannel audio recording such that identifying the one or more redaction markers includes identifying a plurality of redaction markers to be merged within the redaction segment. In some such circumstances, this aspect can include comparing and merging redaction markers across different channels into redaction segments. In addition, or in alternative, the intervening redaction markers can be within redtime proximity to the first redaction marker or the second redaction marker such that redacting the audio recording using the first and second redaction markers as described in detail elsewhere herein minimizes uneven audio.

Redacting the audio file can also be carried out in similar manners as described elsewhere herein. For instance, redacting the audio recording using the first redaction marker and the second redaction marker can be a multi-step process. This step can include processing the audio file into redaction time segments and non-redaction time segments. The redaction time segments include the redaction segments formed between start and end points of corresponding redaction markers. For instance, this step can include outputting the redaction time segments and non-redaction time segments to the destination file to form a sanitized audio file sequentially, as a batch, or some combination of the two.

While this disclosure was discussed in terms of the removal of sensitive data from call center recordings, the principles in this disclosure can be applied to any recorded audio in which the primary component is conversation. Application of the principles disclosed herein can be applied to removal of desired data types for any recording in which the end result is removal of audio associated with that data. While a transcription process will be required in some instances, this disclosure is still useful across multiple industries and scenarios such as recorded meetings to remove customer deemed inappropriate information, 911 dispatch services in which audio release to the public is desired, etc. Some example implementations include training students with live audio such as for doctors, therapists, suicide prevention lines, etc.

While the present disclosure has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains. Some general principles with which to interpret this disclosure are provided below.

As used herein, the modifier "about" used in connection with a quantity is inclusive of the stated value and has the meaning dictated by the context (for example, it includes at least the degree of error associated with the measurement of the particular quantity). When used in context of a range, the modifier "about" should also be considered as disclosing the range defined by the absolute values of the two endpoints. For example, the range "from about 2 to about 4" also disclosed the range "from 2 to 4."

It is well understood that methods that include one or more steps, the order listed is not a limitation of the claim unless there are explicit or implicit statements to the contrary in the specification or claim itself. It is also well settled that the illustrated methods are just some examples of many examples disclosed, and certain steps can be added or omitted without departing from the scope of this disclosure. Such steps can include incorporating devices, systems, or methods or components thereof as well as what is well understood, routine, and conventional in the art.

The connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an example, B alone can be present in an example, C alone can be present in an example, or that any combination of the elements A, B or C can be present in a single example; for example, A and B, A and C, B and C, or A and B and C.

In the detailed description herein, references to "one example," "an example," "an exemplary example," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art with the benefit of the present disclosure to affect such feature, structure, or characteristic in connection with other examples whether or not explicitly described. After reading the description, it will be apparent to one skilled in the relevant art(s) how to implement the disclosure in alternative examples.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

What is claimed is:

1. A computer-implemented method for sanitizing an audio recording of a conversation, the computer-implemented method comprising:

selecting the audio recording of the conversation, the audio recording being transcribed to a transcript;

identifying a plurality of redaction markers at which to mask the audio recording, the redaction markers being identifiable using at least one of the audio recording and the transcript, the plurality of redaction markers having a start point and an end point between which a redaction segment is formable, wherein identifying the plurality of redaction markers includes identifying at least a first redaction marker and second redaction marker to be merged within a merged redaction segment; and sanitizing the audio recording by forming the merged redaction segment.

2. The computer-implemented method of claim 1, wherein the audio recording is a mono-channel recording or a multichannel audio recording, and wherein when the audio recording is a multichannel audio recording, identifying the plurality of redaction markers includes comparing redaction markers across different channels in the multichannel audio recording.

3. The computer-implemented method of claim 1, wherein first and second redaction markers of the plurality of redaction markers are in redtime proximity such that redacting the audio recording between the start point of the second redaction marker and the end point of the first redaction marker minimizes uneven audio.

4. The computer-implemented method of claim 1, wherein sanitizing the audio recording includes removing voice data and background noise that has been recorded in the audio recording.

5. The computer-implemented method of claim 1, wherein the plurality of redaction markers are identifiable using the transcript.

6. The computer-implemented method of claim 1, wherein the plurality of redaction markers are identifiable using the transcript; and wherein the plurality of redaction markers optionally correspond to dead spaces within the conversation as indicated by the transcript.

7. The computer-implemented method of claim 1, wherein sanitizing the audio recording comprises outputting audio from the audio recording to an audio file such that the audio file includes both masked audio at the merged redaction segment and non-redacted audio outside of the merged redaction segment, the audio file thereby becoming a sanitized audio file.

8. The computer-implemented method of claim 1, wherein identifying the plurality of redaction markers is performed by a machine learning architecture.

9. A data processing system for intelligently sanitizing an audio recording of a conversation, the data processing system comprising:
an input module that is configured to receive the audio recording of the conversation, the audio recording being transcribed to a transcript;
an identification module that is configured to identify a plurality of redaction markers at which to mask the audio recording, the plurality of redaction markers being identifiable using at least one of the audio recording and the transcript, the plurality of redaction markers having a start point and an end point between which a redaction segment is formable, wherein identifying the plurality of redaction markers includes identifying at least a first redaction marker and second redaction marker to be merged within a merged redaction segment; and
a processing module that is configured to sanitize the audio recording by forming the merged redaction segment.

10. The data processing system of claim 9, wherein the audio recording is a mono-channel recording or a multichannel audio recording, and wherein when the audio recording is a multichannel audio recording, identifying the plurality of redaction markers includes comparing redaction markers across different channels in the multichannel audio recording.

11. The data processing system of claim 9, wherein first and second redaction markers of the plurality of redaction markers are in redtime proximity such that redacting the audio recording between the start point of the second redaction marker and the end point of the first redaction marker minimizes uneven audio.

12. The data processing system of claim 9, wherein forming the merged redaction segment at the plurality of redaction markers comprises:
processing the audio recording into redaction time segments and non-redaction time segments; and
outputting audio from the audio recording to an audio file such that the audio file includes both masked audio at the merged redaction segment and non-redacted audio outside of the merged redaction segment, the audio file thereby becoming a sanitized audio file.

13. The data processing system of claim 9, wherein identifying the plurality of redaction markers is performed by a machine learning architecture; and wherein forming the merged redaction segment at the plurality of redaction markers includes removing voice data and background noise that has been recorded in the audio recording.

14. The data processing system of claim 9, wherein the plurality of redaction markers are identifiable using the transcript; and wherein the plurality of redaction markers correspond to dead spaces within the conversation as indicated by the transcript.

15. A non-transitory computer-readable medium that stores instructions that, when executed by one or more processors, cause the one or more processors to:
select an audio recording of a conversation, the audio recording being transcribed to a transcript;
identify a plurality of redaction markers at which to mask the audio recording, the plurality of redaction markers being identifiable using at least one of the audio recording and the transcript, the plurality of redaction markers having a start point and an end point between which a redaction segment is formable, wherein identifying the plurality of redaction markers includes identifying at least a first redaction marker and second redaction marker to be merged within a merged redaction segment; and
sanitize the audio recording by forming the merged redaction segment.

16. The non-transitory computer-readable medium of claim 15, wherein the plurality of redaction markers is identifiable using the transcript; wherein the plurality of redaction markers correspond to dead spaces within the conversation as indicated by the transcript; and wherein sanitizing the audio recording comprises outputting audio from the audio recording to an audio file such that the audio file includes both masked audio at the merged redaction segment and non-redacted audio outside of the merged redaction segment, the audio file thereby becoming a sanitized audio file.

17. The non-transitory computer-readable medium of claim 15, wherein identifying the plurality of redaction markers includes identifying a plurality of redaction markers to be merged within the merged redaction segment, the plurality of redaction markers including first and second redaction markers; and wherein at least one of:
the audio recording is a mono-channel recording or a multichannel audio recording, and wherein when the audio recording is a multichannel audio recording, identifying the plurality of redaction markers includes comparing redaction markers across different channels in the multichannel audio recording; and
the redaction markers are within redtime proximity to the first redaction marker or the second redaction marker such that redacting the audio recording between the start point and the end point minimizes uneven audio.

18. The non-transitory computer-readable medium of claim 15, wherein forming the merged redaction segment at the first and second redaction markers comprises:
processing the audio recording into redaction time segments and non-redaction time segments; and
outputting sanitized audio to an audio file such that the audio file includes masked audio at the merged redaction segment.

* * * * *